United States Patent [19]

Foster

[11] 4,002,413
[45] Jan. 11, 1977

[54] ADJUSTABLE MOUNTING FOR AUXILIARY FARM IMPLEMENT

[75] Inventor: Phillip W. Foster, Rochelle, Ill.

[73] Assignee: Lee Blacksmith, Inc., Rochelle, Ill.

[22] Filed: Sept. 8, 1975

[21] Appl. No.: 611,508

[52] U.S. Cl. .............................. 403/234; 403/291; 403/392; 403/396

[51] Int. Cl.² .......................................... F16B 7/04

[58] Field of Search .......... 403/234, 237, 220, 291, 403/385, 386, 392, 396; 254/133 R, 134 R; 81/66 R, 66 A

[56] References Cited

UNITED STATES PATENTS

| | | | |
|---|---|---|---|
| 1,107,798 | 8/1914 | Jones | 403/392 |
| 1,432,561 | 10/1922 | Johnson | 403/392 X |
| 2,399,681 | 5/1946 | Kemner | 52/758 C X |
| 2,884,265 | 4/1959 | Boughton | 403/234 X |
| 2,968,978 | 1/1961 | Wheeler | 81/66 R X |
| 3,380,786 | 4/1968 | Petersen | 403/396 |
| 3,888,446 | 6/1975 | O'Brien | 403/392 X |

*Primary Examiner*—Wayne L. Shedd
*Attorney, Agent, or Firm*—Leydig, Voit, Osann, Mayer & Holt, Ltd.

[57] ABSTRACT

An auxiliary implement adapted for use in combination with different makes and models of first implements includes an adjustable mounting for securing the auxiliary implement to different sizes and shapes of frame members in the first implements. The mounting comprises a bracket secured to a support in the auxiliary implement and the bracket includes a forwardly projecting portion engageable with the upper side of the frame member to which the auxiliary implement is to be connected. A side portion of the bracket extends laterally beyond the side of the support and includes a vertically extending hole formed therethrough. Mounted on the bracket forwardly of the hole is a rearwardly extending tongue having a free end portion located adjacent the hole. The forward end portion of a line in the form of a roller chain is connected to the tongue by being telescoped over the tongue and between the links of the chain. Pinned on the opposite end of the chain is a threaded bolt and the bracket is secured to the frame by wrapping the chain in a forward direction around the frame and telescoping the bolt upwardly through the hole. A nut threaded on the end of the bolt serves to draw the bolt upwardly and thereby tighten the chain around the frame. To keep the tongue from being bent during tightening, a spacer is telescoped over the bolt and fits beneath the free end portion of the tongue on one side of the hole. On the opposite side of the hole, a lug projecting upwardly from the spacer serves to support the other side of the nut thereby keeping the nut from binding on the bolt during tightening.

3 Claims, 4 Drawing Figures

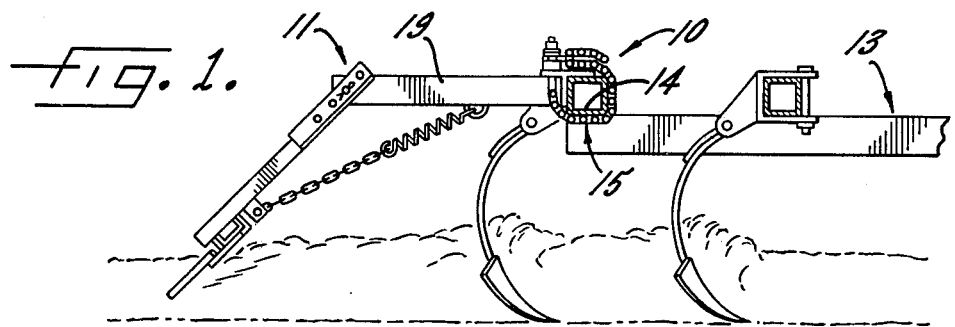
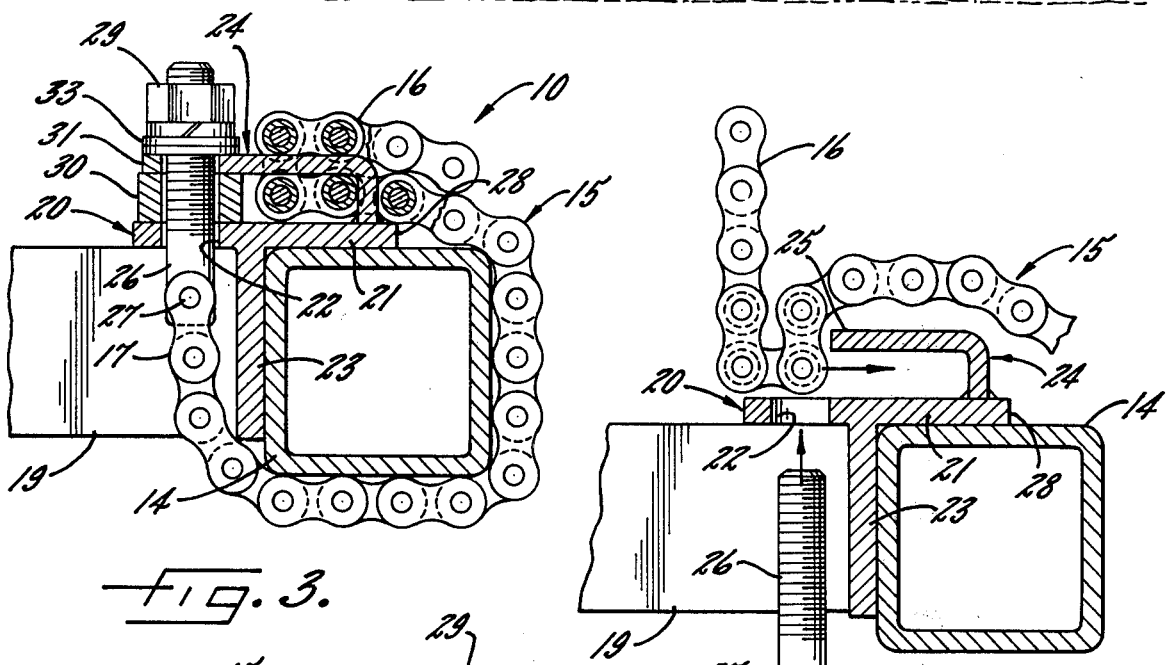
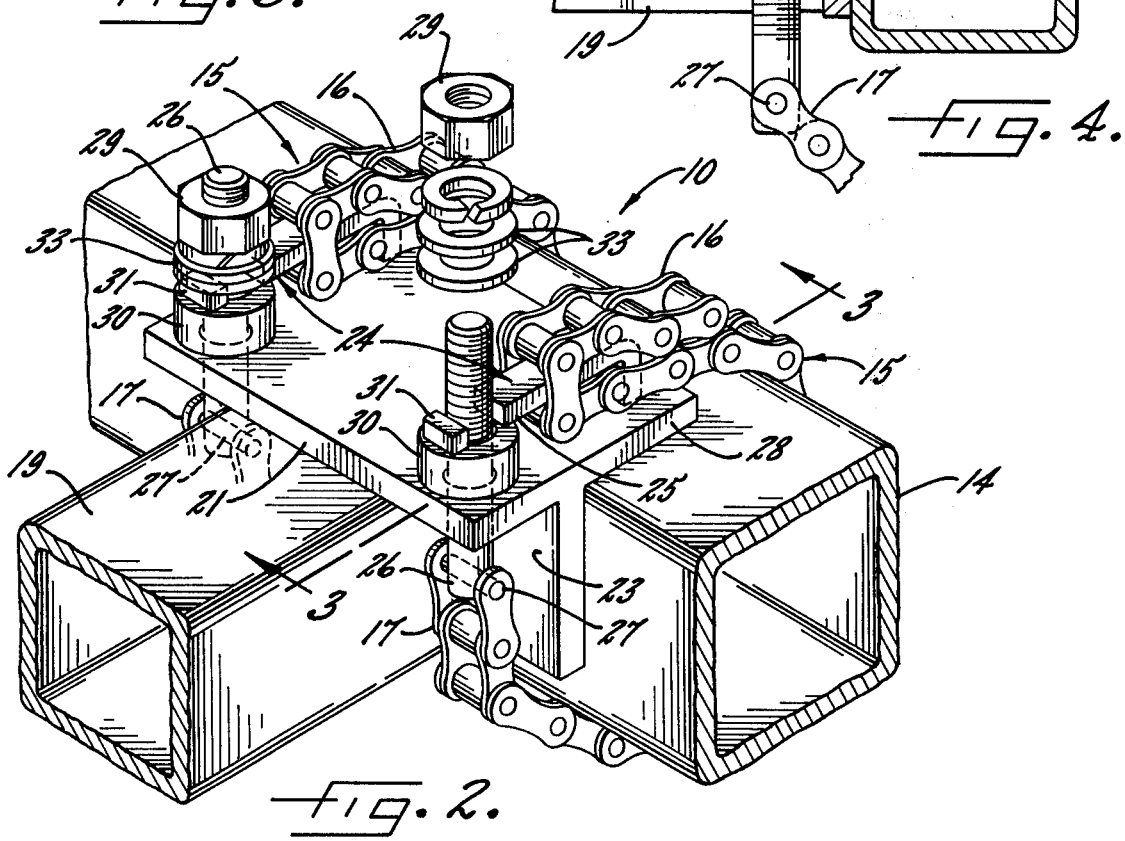

ADJUSTABLE MOUNTING FOR AUXILIARY FARM IMPLEMENT

BACKGROUND OF THE INVENTION

The present invention relates to a mounting for securing an auxiliary farm implement to a frame member of a first implement and, more particularly, to the type of mounting which is adjustable for connection to frame members of different sizes. For instance, first and second farm implements such as a cultivator and a field drag may be connected in tandem behind a tractor for working the soil in a field. The same make and model of field drag may be used on different makes and models of cultivators or other implements. Accordingly, it is desirable that the mounting or connection between the first implement such as the cultivator and the auxiliary implement such as the field drag be adjustable in size so the auxiliary implement may be mounted on the different makes and models of first implements that are available.

One form of adjustable mounting of the foregoing type is disclosed in my copending application entitled Field Drag and filed Apr. 7, 1975, Ser. No. 565,861.

SUMMARY OF THE INVENTION

The primary object of the present invention is to provide a new and improved adjustable mounting of the foregoing general character which is particularly adapted for use in quickly and easily securing an auxiliary implement to a wide range of different sizes and shapes of frame members of first implements. A more detailed object is to achieve the foregoing by constructing the mounting to include an adjustable length flexible line adapted to be wrapped around the frame member of the first implement with both end portions of the line being secured to the auxiliary implement.

A further object is to construct the mounting to include a unique arrangement for anchoring one end of the line to the auxiliary implement to provide a selected length of line for tightening around the frame member.

The invention also resides in the novel construction of the mounting whereby one end of the line is anchored to the auxiliary implement by a rearwardly projecting tongue having one end fixed to the auxiliary implement and an opposite, free end which is secured to the implement as an incident to fastening the other end of the line to the auxiliary implement.

Still further, the invention resides in the unique manner of securing the free end portion of the tongue to the auxiliary implement so as to avoid bending the tongue and to maintain proper alignment of parts of the mounting as the line is tightened around the frame member.

These and other objects and advantages of the present invention will become more apparent from the following detailed description when taken in conjunction with the accompanying drawings.

BRIEF DESCRIPTION OF THE DRAWINGS

FIG. 1 is an elevational view showing an auxiliary implement secured to a frame member of a first implement by means of a mounting embodying the novel features of the present invention.

FIG. 2 is an enlarged, fragmentary perspective view of the mounting of the present invention.

FIG. 3 is a cross-sectional view taken substantially along line 3—3 of FIG. 2.

FIG. 4 is a cross-sectional view generally similar to FIG. 3 but showing parts of the mounting in initial alignment with each other prior to securing the auxiliary implement to the frame of the first implement.

DETAILED DESCRIPTION OF THE PREFERRED EMBODIMENT

As shown in the drawings for purposes of illustration, the present invention is embodied in a mounting 10 for securing an auxiliary farm implement 11 in tandem with another farm implement 13. Herein, the mounting is utilized to fasten an auxiliary implement such as a field drag 11 to a rearward frame member 14 of a cultivator so as to enable the drag to work the soil behind the cultivator, both implements being pulled through the soil by the same tractor. It will be appreciated, however, that the exemplary mounting also could be used in connecting other types of farm implements in tandem, depending upon the particular combination of implements desired for working the soil.

With auxiliary implements such as the field drag 11, it is desirable that the mounting 10 be adjustable in size so that drags of identical manufacture may be used in combination with different makes and models of other implements 13 wherein the frame members 14 may differ in size and shape from one make or model to the next. In accordance with the primary aspect of the present invention, the adjustable mounting 10 is constructed in a unique fashion for quickly and easily securing the auxiliary implement to a wide range of different sizes and shapes of frame members 14. For these purposes, the mounting includes a flexible line 15 adapted to be wrapped around the frame and having opposite end portions 16 and 17 connectable with the auxiliary implement to secure the latter to the frame of the other implement. Advantageously, for different sizes of frame members, means for securing one end portion of the line may be connected to the line at positions spaced selected distances from the one end of the line so as to provide a selected length of line for tightening around the particular frame member to which the auxiliary implement is to be anchored. The other end of the line is connected to the auxiliary implement by suitable means for drawing the line tightly around and securing the auxiliary implement to the frame member. With this arrangement, the auxiliary implement may be secured quickly and easily to a wide range of different sizes and shapes of frame members 14; the mounting thus providing a universal connection for securing the auxiliary implement in tandem with another implement regardless of the make and model of the latter.

In the present instance, the mounting 10 is secured to the forward end of a horizontal support 19 carrying the soil working parts of the auxiliary implement or field drag 11. The frame member 14 of the other implement 13 is shown as having a square, tubular configuration. It will be appreciated, however, that the mounting of the present invention would function equally well with other shapes of frame members including channel-shaped and circular frame members. Connecting the forward end of the support to the frame member and forming a portion of the mounting is a generally T-shaped bracket 20 including horizontal and vertical plates 21 and 23. Both of the plates are welded to the end of the support and extend laterally across the support with opposite ends of the plates projecting beyond the sides of the support. More particularly, the horizontal plate if fixed to the top of the support and includes a forward half defining a lip 28 which projects beyond the end of the support to fit partially across the upper side of the frame member 14. The vertical plate is formed integrally with the horizontal plate and extends downwardly from the center portion thereof and along the forward end of the support to abut with the rearward side of the frame member when the auxiliary implement is secured to the implement 13.

As shown in FIG. 2, to secure the support 19 to the frame member 14, two flexible lines 15 in the form of roller chains are wrapped around the frame member with the opposite end portions 16 and 17 of the chains being fastened to the bracket 20. More particularly, the chains are secured to the projecting opposite end portions of the plates 21 and 23 (see FIG. 2) and in this way are spaced laterally from the support 19. Herein, both chains are secured to the bracket in the same fashion. Accordingly, the manner of securing only one of the chains to the bracket will be described in detail, it being appreciated that the other chain is secured to the bracket in a like fashion.

In the exemplary form of the invention, the means for anchoring the forward end 16 of the chain 15 to the bracket 21 is in the form of a rearwardly projecting tongue 24 having a forward end portion fixed to the forward half of the horizontal plate 21 adjacent one end thereof. A similar tongue is fixed to the plate adjacent the other end thereof for the other chain. Projecting rearwardly from the forward end of the tongue is a free end portion 25 which is spaced above the top of the horizontal plate and terminates vertically of the forward edge of a hole 22 (see FIG. 4) extending through the projecting end of the plate 21. Advantageously, the tongue is sized to fit between the links of the chain thereby enabling the chain to be folded upwardly from opposite ends of one of the links and telescoped forwardly onto the tongue as is shown in FIG. 4. Accordingly, to select the length of chain desired for tightening around the frame member 14, the chain simply may be folded at the appropriate link along its length.

As shown in FIGS. 2, 3 and 4, the means for fastening the rearward end portion 17 of the chain 15 to the bracket 20 and for tightening the chain around the frame member 14 includes a fastener in the form of a headless bolt 26 which is secured to the forward end of the chain between the opposite sides of a link by a pin 27 extending through the sides and the bolt. The upper end portion of the bolt is threaded so that after the bolt is telescoped upwardly through the hole 22 in the projecting end portion of the plate 21 a suitable nut 29 may be threaded onto the bolt to draw the latter upwardly and thereby tighten the chain around the frame member.

In securing the auxiliary implement 11 on the frame member 14, it will be appreciated that with the free end 25 of the tongue 24 aligned vertically with the forward edge of the hole 22 it is necessary to telescope the chain onto the tongue prior to inserting the bolt upwardly through the hole. Moreover, and in accordance with another advantageous feature of the present invention, a spacer 30 is utilized between the free end of the tongue and the plate 21 so as to support the tongue against being bent toward the plate as the nut 29 is tightened on the bolt. Preferably, the spacer is cylindrical in form having a central opening whose diameter is approximately equal to the diameter of the hole 22 and a thickness slightly less than the vertical width of the space between the underside of the tongue and the top of the plate. Accordingly, when coupling the auxiliary implement 11 to the frame member 14, the spacer may be placed over the hole with one side of the spacer fitting between the tongue and the plate (see FIG. 3). Thereafter, the upper end portion of the bolt may be telescoped upwardly through both the hole and the spacer to receive the nut. Advantageously, to keep the nut from binding on the bolt during tightening, an upwardly projecting lug 31 is formed on the side of the spacer opposite the tongue and is of a thickness approximately equal to the thickness of the tongue so the tongue and lug provide diametrical support for the nut. Herein, washers 33 are telescoped over the projecting portion of the upper end of the bolt and engage the upper surfaces of the tongue and the lug so as to provide a flat surface against which the nut may abut when turned to draw the bolt upwardly in tightening the chain around the frame member. By virtue of having the nut supported in the foregoing described manner, the nut is kept from binding on the bolt during tightening. Moreover, and perhaps more importantly, the free end portion of the tongue thus is clamped tightly to the bracket between the nut 29 and the plate 21 so as to keep from being easily bent away from the plate by the chain as the latter is tightened around the frame member.

From the foregoing, it is seen that the novel mounting 10 enables the auxiliary implement 11 to be quickly and easily secured in tandem with different makes and models of other farm implements 13. Advantageously, the flexible line or chain 15 in the mounting is used to secure the auxiliary implement to the frame member 14 of the other implement and may be adjusted in length for the particular size and shape of member by simply telescoping the approximate link in the forward end 16 of the chain onto the tongue 24. The other end 17 of the chain is anchored to the bracket 20 by means of the bolt 26 and the nut 29 and, as an incident to tightening the nut on the bolt, the free end 25 of the tongue is clamped to the bracket between the spacer 30 and the washers 33 to avoid being bent as the chain is drawn tightly around the frame member.

I claim:

1. A mounting for securing an auxiliary farm implement to the frame of a first implement, said mounting including a bracket rigidly secured to the forward end of the auxiliary implement and having a first portion disposed in a generally vertical plane to abut the rear of said frame, said bracket having a second portion formed integrally on the upper end of said first portion and disposed in a generally vertical plane with at least a part of said second portion projecting rearwardly of said first portion, said part having a hole, a tongue rigid with the upper side of said second portion and spaced above the latter, said tongue projecting rearwardly and terminating adjacent the forward edge of said hole, an elongated vertical bolt having threads formed along its upper end portion, an elongated flexible chain comprising a plurality of connected links with one end of the chain being pivotally connected to the lower end of said bolt and the other end being free, one of said links adjacent the free end of said chain being received on said tongue and the portion of the chain between said one link and said bolt extending across the top, the forward side and the bottom of said frame, said bolt being behind said first portion of said bracket with the threaded end portion projecting through said hole and above said tongue, and securing means including a nut threaded on the upper end of said bolt and bearing on the rear end of said tongue, said securing means being operable to tighten said chain securely around said frame.

2. A mounting as defined in claim 1 including a spacer encircling said bolt and resting on the top of said second portion of said bracket, said spacer projecting in under said tongue, and a lug formed on top of said spacer and being substantially level with said tongue whereby said securing means engages said tongue and said lug.

3. A mounting means as defined in claim 1 wherein said second portion of said bracket has a second part projecting forwardly over said frame whereby said bracket engages the top and the rear of said frame, said tongue being fixed to said second part.

* * * * *